United States Patent Office 3,173,192
Patented Mar. 16, 1965

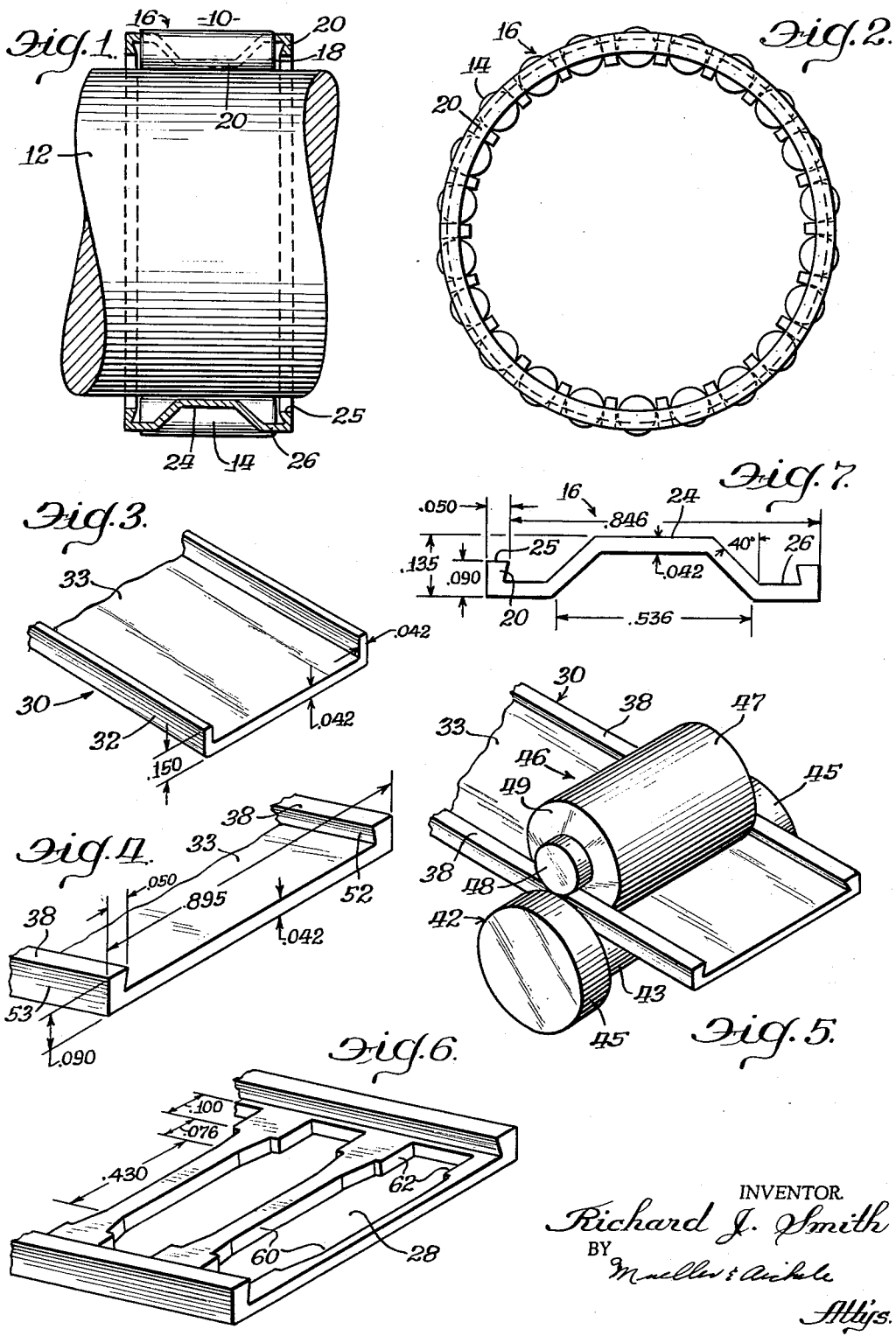

3,173,192
METHOD FOR FABRICATING ROLLER
BEARING RETAINERS
Richard J. Smith, Valparaiso, Ind., assignor to McGill Manufacturing Company, Inc., Valparaiso, Ind., a corporation of Indiana
Filed Dec. 5, 1962, Ser. No. 242,457
10 Claims. (Cl. 29—148.4)

This invention relates to bearing assemblies and more particularly to a method of making a double retention type roller bearing assembly.

This application is a continuation-in-part of application Serial No. 143,413, filed October 6, 1961, by Richard J. Smith and assigned to the present assignee.

In many applications it is necessary to provide a bearing wherein neither inner nor outer races are provided with the assembly. In such an application a full complement of rollers may be used, or alternately, segmented retainers may be employed. It has been found, however, that if a full complement of rollers is used there is little or no roller guidance, and in addition, there is a definite limit in operating speeds. Due to the large quantity of parts, assembly problems are also encountered.

Another bearing assembly used in the past for such an application consists of a device having rollers retained in place between punched end plates separated by spacer bars. Loose tolerances in construction methods limit the use of this assembly and it has therefore been used only with relatively light loads such as caster wheels and the like.

In still another bearing design rollers are disposed in slots formed in the retaining member. This construction meets requirements wherein one of the race elements is a part of the equipment to which the bearing is applied or in which the rollers are mounted between two separate race elements. In a retainer of this construction, the rollers are free to fall inwardly and/or outwardly from the retainer when the bearing is not supported between two races.

The above disadvantages may be overcome by the use of a double retention type cage or retainer wherein a cylindrical member having centrally depressed crossbars joining the axial ends thereof define pockets having relatively wide center dimensions and narrowing end dimensions to hold the rollers in position within the retainer. The axial ends of the cylinder are further provided with radially inwardly extending flanges to provide axial guidance for the rollers. However, double retention cages for use with a precision high load, high speed roller bearing assembly are often complex and expensive to manufacture. Although the slots and crossbars may be readily punched and formed from a cylindrical shell, such an operation requires special tooling. Also, further processing and tooling are necessary to fabricate the radially inwardly extending flanges capable of withstanding high axial thrust on the relatively thin-walled cylinder. In manufacturing processes wherein the retention pockets are punched in flat stock and subsequently rolled into cylindrical form the possibility of buckling and cracking places limits on the dimensions of the radially extending flanges which may restrict the thrust capabilities of the assembly.

It is therefore an object of the invention to provide an improved method of manufacturing a precision high load, high speed roller bearing assembly.

Another object is to provide an improved method of manufacturing a double retention cage for roller bearing assemblies of the above-described type.

A further object is to provide an economical method of manufacturing a rigid, stable roller bearing assembly with improved load capabilities, which method minimizes tooling costs.

A feature of the present invention is the provision of a method of manufacturing roller bearing assemblies including the steps of forming integral non-uniform flanges on the elongated edges of a length of steel strip, punching spaced slots in the strip and cutting the strip to a desired length, depressing portions of the cross-bars defining the slots to form a roller retaining pocket, rolling the strip into a cylindrical configuration and securing the ends thereof, and inserting rollers into the pocket to complete the bearing assembly.

A further feature is the provision, in the above described method, of the steps of forming the length of flat strip steel into a generally U-shaped configuration with side walls of stock thickness, and providing the side walls with a non-uniform, thickened cross-section to facilitate rolling into a cylindrical form and to provide the cylinder with radially inwardly extending flanges for improved axial guidance of the rollers in the completed assembly.

A further feature of the invention is the utilization of low carbon steel in fabricating the retention cage by the above-described method to enable standard tooling to be employed, with the retention cage being heat treated to the desired hardness prior to the insertion of rollers in the completed assembly.

Still another feature is the formation of the thickened, non-uniform flanges by a rolling process so that such flanges make a sharp corner at the point where they join the major surface of the strip and are provided with uniform dimensions throughout the length of the strip.

Other objects, features and attending advantages will become apparent from the following description, when taken in conjunction with the accompanying drawings, in which:

FIG. 1 is a perspective view, partly in section, of a bearing assembly fabricated in the manner of the present invention;

FIG. 2 is a side elevational view of the bearing assembly of FIG. 1;

FIG. 3 is a perspective view of the U-shaped strip prior to the steps of providing the side walls thereof with the desired cross-sectional configuration;

FIG. 4 is a fragmentary perspective view of the strip of FIG. 3 subsequent to the operation of forming the side walls into flanges of non-uniform cross-section;

FIG. 5 illustrates the manner in which the U-shaped strip is formed to provide the shape of FIG. 4;

FIG. 6 shows the strip of FIG. 5 after the slot forming operation; and

FIG. 7 is a cross-sectional view of the strip after the center depressing operation.

In practicing the present invention there is provided a strip of low carbon steel which is formed into a U-shaped cross-section of uniform cross-section sidewalls and center section. The side walls are then formed by a rolling operation so as to be provided with a non-uniform cross-section, the extremities of which are thickened with respect to the center section of the strip so that a generally tapered cross-section is given to the side walls. Slots are punched in the center section of the strip and the strip is simultaneously cut to a desired length. The center portion of the remaining cross bars which join the formed side walls or flanges are then depressed and the strip is rolled into a cylindrical shape, with its ends welded, to provide a retention cage with pockets having a relatively wide center dimension and narrowing end dimensions for double roller retention. The retention cage is then heat treated to the desired hardness and subsequently rollers are inserted into the pockets, preferably by jigging means so that all of the rollers may be inserted at the same time.

Referring now particularly to FIG. 1, the roller bearing assembly 10 is shown rotatably mounted upon shaft 12. Elongated cylindrical rollers 14 are circumferentially spaced about retainer 16 and have their ends 18 abutting upon radially inwardly extending annular flanges 20. Axial movement of rollers 14 is restrained by flanges 20. Flanges 20 have a thickened radial dimension to afford added stability to the retainer 16. Circumferential spacing of rollers 14 is maintained by cross-bars 22. The cross-bars 22 have substantially flat center portions 24 which are radially inwardly depressed beyond the inner edges 25 of flanges 20. End portions 26 of cross-bars 22 are circumferentially enlarged as can be seen in FIG. 6. Rollers 14 are seated in the retaining slots formed by the relative spacings between the inwardly depressed central portion 24 and the enlarged end portion 26 of the cross-bars 22.

In FIG. 2 roller 14 are shown circumferentially spaced within the retainer 16. Adjacent cross-bars are spaced to seat rollers which have a diameter slightly in excess of the extent of radially inward depression 24 of cross-bars 22 to insure that the rollers will rotatably abut upon the inner and outer races of the apparatus with which assembly 10 is used.

In manufacturing the bearing assembly retainer 16 of FIGS. 1 and 2, a strip of low carbon steel 30 of the proper width is formed into a U-shaped configuration having uniform cross-section side walls 32 and center section 33. The height of side walls 32 is in the order of three to four times the stock thickness of the strip. The U-shaped configuration may be formed by a rolling or a stamping process.

Side walls 32 are subsequently formed to provide integral, generally tapered flanges 38 extending along each longitudinal edge of strip 30, as shown in FIG. 4. The desired cross-section for flanges 38 is provided by a rolling operation as illustrated in FIG. 5. Strip 30 is subjected to a series of passes through sets of rollers, as illustrated by roller assemblies 42 and 46, to reduce the height of side walls 32 to approximately two and one-half times the stock thickness, with a corresponding widening of the top portion of flanges 38. Bottom roller assembly 42 includes a main support roller 43, and auxiliary side rollers 45 located outside the side walls of the strip to maintain the outside edges of flanges 38 at substantially right angles to center section 33. Top roller assembly 46 includes a main support roller 47, and auxiliary end rollers 48 to provide downward pressure on the top of side walls 32 to thereby form the generally tapered flange 38. Main support rollers 43 and 47 function as the drive rollers while rollers 48 reduce the height of side walls 32 with repeated passes. The axial ends 49 of rollers 47 are contoured to allow for metal flow during the rolling process so that resultant flanges 38 has a generally tapered inner surface shown in FIG. 4.

As a consequence of the rolling process illustrated in FIG. 5, flanges 38 of the strip of FIG. 4 are provided with an angularly disposed inner surface 52 forming an acute angle with center portion 33 of strip 30. The outer surfaces 53 of flanges 38 are maintained at substantially right angles to surface 33. Because of the rolling operation relatively sharp corners are maintained at the point flanges 38 join surface 33, and the dimensions of flanges 38 are uniform throughout the length of strip 30. This results in generally taper flanges 38 having a top surface of greater thickness than the thickness at the bottom where it is joined with a center section 33 of strip 30. Such a tapered construction allows the strip to be subsequently rolled into a cylindrical shape without deforming or wrinkling to provide the inwardly extending angular flange 20 (FIG. 1), having a thickened radial portion to afford additional stability against axial movement of the rollers.

Strip 30 is then cut into the desired length and slots 28 are punched into surface 33. Preferably the cutting and punching are done simultaneously in a single operation. As seen from FIG. 6, slots 28 have a circumferentially enlarged center area 60 and narrow end area 62. As hereafter described, the resultant retaining pockets defined by these slots and the inwardly depressed cross-bars 22 provide double retention for rollers 16. Since the wide portion of the slots is in the center, it is possible to utilize a punch which is heavier in the central area where the largest amount of work is being done, thus resulting in longer tool life.

The next step in constructing retainer 16 is depressing the center portions 24 of cross-bars 22. This may be done in any of a variety of known ways, such as by flat forming. The substantially flat center portions 24 are depressed inwardly of the inner edge 25 of flanges 20, as illustrated in FIG. 6. After depressing the center portions 24 the strip is rolled into a cylindrical shape and the ends of the strip are joined together. The joining operation may be by fusion welding. The formed retainer is then straightened and cleaned by any of the known procedures and may subsequently be heat treated to a case depth up to approximately .010 inch, depending upon the size of the retainer and its intended use. Depths of .005 to .007 inch have been found to be particularly advantageous for retainers of the approximate size shown.

In the final cylindrical form of retainer 16 the circumferential distance 60 between adjacent depressed center portions 24 of bars 22 is slightly less than the diameter of a roller 14 and is located below its axis to prevent said roller from dropping inward when placed in the retainer. End areas 62 of the non-depressed portions 26 of cross-bars 22 have a circumferential distance between adjacent cross bars which is also slightly less than the diameter of a roller 14, but located above the axis thereof to prevent the roller from dropping outward when placed in retainer 16. Thus, the inward depression of cross bars 22 in their non-uniform cross-section resulting from punching of slots 28 with a circumferentially large center area cooperate to define a retaining pocket providing double radial retention of the roller bearings. At the same time, tapered end flanges 20 provide against axial movement of the rollers.

The retainer 16 is now ready to resiliently receive the rollers 14. All of the rollers 14 are inserted into retainer pockets between the depressed center portions 24 of cross bars 22 simultaneously. The rollers 14 and retainer 16 are held in a suitable jig, and in the known manner the rollers 14 are snapped outwardly from the jig into a position within the pockets defined by the slots and cross bars 22 of retainer 16 all in one operation. To facilitate this operation, an expendable mandrel may be employed with the jig which inserts the rollers in the retainer. As the mandrel expands, bearing on the rollers, the retaining surfaces of the roller containing pockets are also slightly expanded to allow the rollers to easily snap into place. This method of assembly is particularly well suited to mass production techniques. Bearing assembly 10 is then completed as it appears in FIGS. 1 and 2 of the drawings.

The dimensions shown in FIGS. 3–7, although not to be limiting, are typical of those which may be utilized in making the bearing assembly of the present invention. From such dimensions it can be readily seen that it is possible, starting with a strip of relatively thin low carbon steel, to fabricate a compact, rugged integral bearing assembly. The dimensions and materials are such that no machining or special tooling is necessary, and standard production techniques may be utilized to keep costs at a minimum.

It is difficult, if at all possible, to roll a U-shaped strip of the dimensions generally shown in FIG. 3 into a cylindrical configuration without buckling or cracking of side walls 32. However, by providing the side walls 32 of the strip with a thickened, non-uniform cross-section this rolling can be readily accomplished. For bearings of the dimensions shown, it is desirable to reduce the height of the side walls of the strip to approximately 2 to 2½ times the stock thickness from a somewhat greater height, and to widen the top portion of the side walls to approximately 1¼ to 1½ times the stock thickness. This can be accomplished by providing side walls 32 of strip 30 with an original height that is from 3 to 4 times the stock thickness, and passing the stock through 4 or 5 roller combinations while reducing the height of approximately .010 inch per rolling cycle. The resultant strip is then provided with the thickened flanges 38 of a generally tapered cross-section as shown in FIG. 4. This shape enables the strip to be readily rolled in a circular configuration while at the same time providing the flanges 38 with sufficient strength to withstand the axial thrust forces experienced in heavy duty, high speed operation of the bearing assembly.

The invention provides therefore an improved method of manufacturing roller bearing assemblies of the described type. The method enables a double retention cage for an anti-friction bearing to be formed from flat strip stock in an economical manner. The novel method by which the axial end flanges of the completed retention cage are formed allows the retention pockets to be formed in the strip prior to rolling into cylindrical form. The method enables the realization of increased dimensional accuracy and decreased tooling costs, while at the same time resulting in a final assembly of simplified design which is capable of high speed, heavy duty operation.

I claim:

1. A method of manufacturing a roller bearing assembly comprising the steps of, providing a substantially flat elongated strip of low carbon steel having a right angle flange on the elongated lengthwise edges thereof to provide a substantially U-shaped configuration, cutting said strip to desired lengths corresponding to the ultimate circumferential dimension of a retainer for the assembly and simultaneously punching a plurality of radially spaced slots along substantially the entire length of the strip, said slots extending substantially the entire distance between said flanges whereby said slots are defined by a plurality of spaced cross bars along the length of said strip and said strip assumes a generally ladder shaped configuration, depressing said cross bars at the center portions thereof, rolling said strip into a cylindrical shape, fusing the adjacent ends of said strip to provide a closed cylindrical configuration for the retainer, preparing said retainer for heat treatment, heat treating said cylinder to the case depth in the range of approximately zero to .010 inch, disposing a plurality of rollers with each having a diameter in excess of the width of said slots between said cross bars and resiliently seating each roller within a corresponding slot, whereby said depressed center portions space said rollers from one another and whereby said rollers are restrained from inward or outward displacement from said retainer.

2. A method of maufacturing a roller bearing assembly comprising the steps of, providing a substantially flat elongated strip of low carbon steel having a right angle flange of non-uniform cross-section on the elongated lengthwise edges thereof to provide substantially U-shaped configuration, cutting said strip to desired lengths corresponding to the ultimate circumferential dimention of a retainer for the assembly and simultaneously punching a plurality of radially spaced slots along substantially the entire length of said strip, said slots extending substantially the entire distance between said flanges whereby said slots are defined by a plurality of spaced cross bars along the length of said strip and said strip assumes a generally ladder shaped configuration, depressing said cross bars at the center portions thereof until the substantially flat crest of said depressed cross bars is below the inner edges of said flanges, rolling said strip into a cylindrical shape, fusing the adjacent ends of said strip to provide a closed cylindrical configuration for the retainer, disposing a plurality of rollers with each having a diameter in excess of the width of said slots between said cross bars and resiliently seating each roller within a corresponding slot, whereby said depressed center portions space said rollers from one another and whereby said rollers are restrained from inward and outward displacement from said retainer.

3. A method of manufacturing a roller bearing assembly comprising the steps of, providing an elongated strip of low carbon metal having a flange formed on each elongated edge to provide a substantially U-shaped strip of metal, cutting said strip to desired lengths corresponding to the ultimate circumferential dimension of a retainer for the assembly and simultaneously stamping a plurality of longitudinally spaced slots along the length of said strip whereby said slots extend substantially between said flanges, said slots provided with an area of reduced dimension at the ends thereof and defined by a plurality of cross bars therebetween, depressing the reduced dimension center portions of said cross bars inwardly, rolling said strip into a substantially cylindrical shape, fusing the ends of said strip together to provide the closed cylindrical configuration for the retainer, preparing said retainer for heat treatment, heat treating to a case depth of approximately .005 to .007 inch, resiliently seating a plurality of rollers within each having a diameter in excess of the width of said slots between each of said cross bars, said rollers being of a length substantially equal to the length of said slots whereby the ends of said rollers abut upon said flanges to restrict axial movement thereof.

4. A method of manufacturing a roller bearing assembly comprising the steps of, providing an elongated strip of metal having side walls formed on the longitudinal edges thereof to provide a substantially U-shaped configuration, with the height of said side walls being substantially greater than the thickness of said strip, reducing the height of said side walls and increasing the thickness of the top portion thereof to provide flanges of non-uniform cross-section on the longitudinal edges of said strip, cutting said strip to desired lengths corresponding to the ultimate circumferential dimension of a retainer for the assembly and simultaneously punching a plurality of longitudinally spaced slots along the length of said strip whereby said slots extend transversely substantially between said flanges, said slots provided with an area of reduced dimension at the ends thereof and defined by a plurality of cross bars therebetween, depressing the center section of said cross bars, rolling said strip into a substantially cylindrical shape, fusing the ends of said strip together to provide a close cylindrical configuration for the retainer, and seating a plurality of rollers between each of said cross bars, said rollers being of a length substantially equal to the length of said slots, whereby the ends of said rollers abut upon a thickened portion of said flanges to restrict axial movement thereof.

5. A method of manufacturing a roller bearing assembly comprising the steps of, providing an elongated strip of low carbon metal having right angle side walls formed on each longitudinal edge thereof to provide a substantially U-shaped strip of metal, with the height of said side wall being substantially greater than the thickness of said strip, subjecting said strip to a series of rolling operations to thereby reduce the height while simultaneously increasing the thickness of said side walls to provide flanges along the longitudinal edges of said strip of a generally tapered cross-section, cutting said strip to a desired length corresponding to the ultimate circumferential dimension of a retainer for the assembly and simultaneously punching a plurality of longitudinally spaced slots along the length of said strip whereby said slots extend transversely substantially between said flanges, said slots provided with an area of reduced dimension at the ends thereof and defined by a plurality of cross bars therebetween, depressing the center section of said cross bars, rolling said strip into a substantially cylindrical shape, fusing the ends of said strip together to provide a closed cylindrical configuration for the retainer, heat treating said cylinder to a case depth in the range of approximately zero to .010 inch, and seating a plurality of rollers between each of said crossbars, said rollers being of a length substantially equal to the length of said spots, whereby the ends of said rollers abut upon a thickened portion of said flanges to restrict axial movement thereof.

6. A method of manufacturing a roller bearing assembly comprising the steps of, providing a substantially flat elongated strip of low carbon steel, providing said strip with right angle side walls on the lengthwise edges thereof to form a U-shape configuration, with the height of said side walls being substantially greater than the thickness of said strip, subjecting said U-shaped configuration to a series of rolling operations to reduce the height of the side walls while simultaneously increasing the thickness of the side walls at the top portions thereof to thereby provide flanges of non-uniform cross-section along the longitudinal edges of said strip, cutting said strip to desired lengths corresponding to the ultimate circumferential dimension of a retainer for the assembly and simultaneously punching a plurality of longitudinally spaced slots along the length of said strip, said slots extending transversely substantially between said flanges, said slots provided with an area of reduced dimension at the ends thereof and defined by a plurality of cross bars therebetween, depressing the center section of said slots, rolling said strip into a cylindrical shape and fusing the ends thereof together to provide a closed cylindrical configuration for the retainer, and inserting a plurality of rollers between each of said cross bars, said rollers being of a length substantially equal to the length of said slots and of a diameter to be retained from falling radially inwardly or outwardly by said depressed cross bars, whereby the ends of said rollers abut upon a thickened portion of said flanges to restrict axial movement thereof.

7. A method of manufacturing a roller bearing assembly comprising the steps of, providing a substantially flat elongated strip of low carbon steel, forming right angle side walls on the lengthwise edges of said strip to thereby provide a U-shaped configuration, with the height of said side walls being three to four times the stock thickness of said strip, reducing the height of said side walls to approximately two and one-half times the stock thickness of said strip, with a corresponding widening of the top portion of said side walls to approximately one and one-fourth to one and one-half times the stock thickness of said strip, thereby providing a generally tapered flange on each longitudinal edge of said strip, cutting said strip to a desired length corresponding to the ultimate circumferential dimension of a retainer for the assembly and simultaneously punching a plurality of longitudinally spaced slots along the length of said strip, said slots extending transversely substantially between said flanges, said slots provided with an area of reduced dimension at the ends thereof and defined by a plurality of cross bars therebetween, depressing the center section of said cross bars, forming said strip into a cylindrical shape, fusing the ends of said strips together to provide a closed cylindrical configuration for the retainer, and seating a plurality of rollers between each of said cross bars, said rollers being of a length substantially equal to the length of said slots, whereby the axial ends of said rollers abut upon a thickened portion of said flanges to restrict the axial movement thereof.

8. A method of manufacturing a retainer adapted to resiliently maintain a plurality of rotatable cylindrical rollers in circumferentially spaced relationship, said method including the steps of providing a substantially flat elongated strip of metallic stock material, forming right angle side walls of a height substantially greater than the stock thickness on the lengthwise edges thereof to provide a substantially U-shaped configuration, reducing the height of said side walls and widening the top portions thereof to provide flanges on the lengthwise edges of said strip of non-uniform cross-section, cutting said strip to desired lengths corresponding to the ultimate circumferential dimension of the retainer, simultaneously punching a plurality of longitudinally spaced slots along the length of said strip, said slots extending substantially between said flanges and defined by a plurality of cross bars therebetween, depressing center portions of said cross bars, forming said strip into a cylindrical shape, and fusing the ends thereof to provide a closed cylindrical configuration, and heat treating said cylinder to a desired case depth.

9. A method of manufacturing a retainer adapted to resiliently maintain a plurality of rotatable cylindrical rollers in circumferentially spaced relationship, said method including the steps of providing a substantially flat elongated strip of metallic stock material, forming right angle side walls of a height substantially greater than the stock thickness to provide a substantially U-shaped configuration, subjecting said U-shaped strip to a series of rolling operations to reduce the height of said side walls while simultaneously increasing the thickness thereof to provide flanges of non-uniform cross-section thickened at the top portion along the longitudinal edges of said strip, cutting said strip to desired lengths corresponding to the ultimate circumferential dimension of the retainer and simultaneously punching a plurality of longitudinally spaced slots along the length of said strip, said slots extending substantially between said flanges and defined by a plurality of cross bars extending therebetween, depressing the center section of said cross bars, forming said strip into a cylindrical shape, and joining the ends thereof to provide a closed cylindrical configuration for the retainer.

10. A method of manufacturing a retainer adapted to resiliently maintain a plurality of rotatable cylindrical rollers in circumferentially spaced relationship, said method including the steps of providing a substantially flat strip of metallic stock material, forming right angle side walls of a height three to four times the stock thickness of the strip on the longitudinal edges thereof, reducing the height of said side walls to approximately two and one-half times the stock thickness of the strip, with a corresponding widening of the top of said side walls to approximately one and one-quarter to one and one-half times the stock thickness of the strip, thereby providing a generally tapered flange on each longitudinal edge of the strip, cutting the strip to desired lengths corresponding to the ultimate circumferential dimension of the retainer, simultaneously punching a plurality of longitudinally spaced slots along the length of the strip, said slots extending substantially between said flanges and being defined by a plurality of cross bars and extending therebetween, depressing center portions of said cross bars, rolling the strip into a substantially cylindrical shape, and fusing the ends of the strip together to provide a closed cylindrical configuration.

References Cited in the file of this patent
UNITED STATES PATENTS

| | | |
|---|---|---|
| 2,591,160 | Kilian | Apr. 1, 1952 |
| 2,848,791 | Neese | Aug. 26, 1958 |